Dec. 9, 1969   H. E. DUFRESNE   3,482,591
PRESSURE REGULATOR VALVE
Filed Aug. 31, 1966
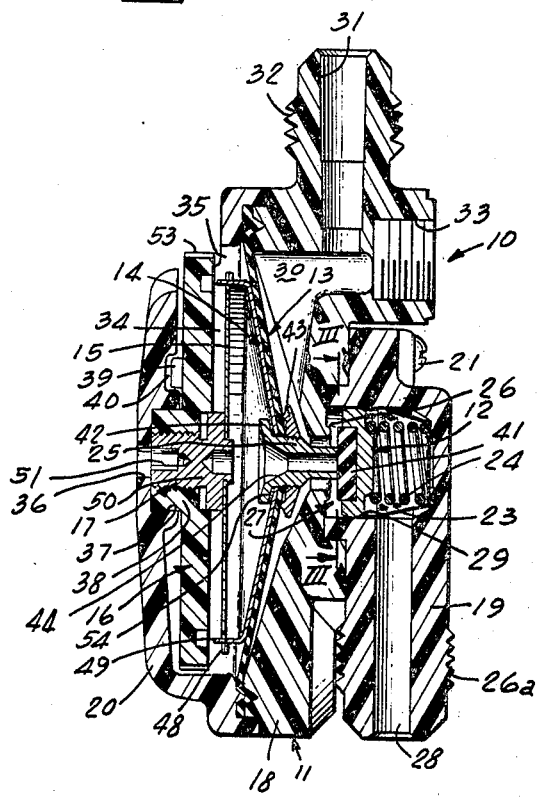
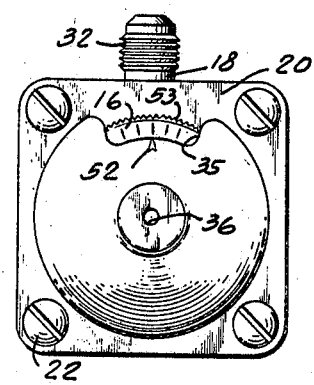
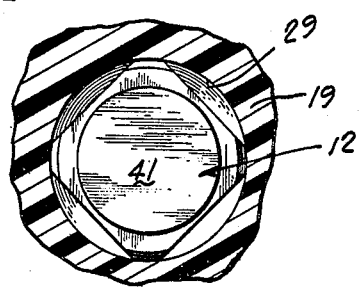
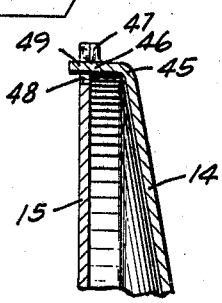
INVENTOR.
HAROLD E. DUFRESNE
BY                                    ATTORNEYS United States Patent Office 3,482,591
Patented Dec. 9, 1969

3,482,591
PRESSURE REGULATOR VALVE
Harold E. Dufresne, St. Paul, Minn., assignor to The Cornelius Company, Anoka, Minn., a corporation of Minnesota
Filed Aug. 31, 1966, Ser. No. 576,348
Int. Cl. G05d 16/18; F16k 17/04
U.S. Cl. 137—116.5                               11 Claims

ABSTRACT OF THE DISCLOSURE

A pressure regulator valve has a diaphragm that is biased by a disc spring adjacent to which is an adjustment dial which gives the device a shallow profile. An adjustable connection is provided between the finger dial and the disc spring and the dial is calibrated in terms of outlet pressure. The device is constructed of water-resistant materials enabling prolonged submersion in water while handling water as the pressure fluid. A cup-shaped backing plate is disposed between the disc spring and the diaphragm.

---

This invention relates to a pressure regulator valve construction.

Although the principles of the present invention may be included in various pressure regulator valves, a particularly useful application is made in a pressure regulator valve assembly that is provided as a component in a beverage dispensing system.

On the downstream side of a pressure regulator, there is frequently provided a gage indicating the pressure that is present. The purpose of such gage is not so much to indicate what pressure in fact is present, but to indicate to the person adjusting the pressure regulator valve the pressure at which said adjustable regulator valve is being set. Further, as the pressure on the downstream side of a pressure regulator valve increases, such pressure regulator valve closes automatically. Should the downstream pressure increase further, for example due to internal leakage or due to application of heat to a portion of the downstream system in an unexpected manner, the integrity of the downstream-pressure system may be in jeopardy, and heretofore a relief valve has been provided to protect such system. Also, heretofore, when the fluid that is being handled is a liquid, such as water, it has been necessary to provide any relief valve with a suitable relief port for conducting away such liquid or fluid as is being relieved.

The present invention contemplates the utilization of such pressure regulator valve structure as enables the elimination of the need for a separate pressure gage, and also eliminates the need for a separate pressure relief valve, and still further eliminates the need for any relief port or tubing to conduct away relieved fluid. Where such fluid constitutes liquid, a feature of this invention is that the regulator valve may be immersed in liquid such as water.

Accordingly, it is an object of the present invention to provide an improved pressure regulator valve construction.

Another object of the present invention is to provide a pressure regulator valve which may be set to provide a selected identified downstream pressure without employment of any pressure gage.

A further object of the present invention is to provide a pressure regulator valve by which excessive downstream pressure may be relieved.

A still further object of the present invention is to provide a pressure regulator valve for both regulating and relieving downstream pressure while such valve is submersed in liquid.

Yet another object of the present invention is to provide a pressure regulator valve constructed to relieve excessive downstream liquid pressure without a need for a separate line to conduct away relieved liquid.

Many other advantages, features and additional objects of the present invention will become manifest to those versed in the art upon making reference to the detailed description and to the accompanying sheet of drawings in which a preferred structural embodiment incorporating the principles of the present invention is shown by way of illustrative example.

On the drawings:

FIG. 1 is an enlarged cross-sectional view of a pressure regulator valve provided in accordance with the principles of the present invention;

FIG. 2 is a front elevational view of the regulator valve shown in FIG. 1;

FIG. 3 is a fragmentary enlarged cross-sectional view taken along line III—III of FIG. 1; and FIG. 4 is an enlarged fragmentary view of a portion of FIG. 1.

As shown on the drawings:

The principles of this invention are particularly useful when embodied in a pressure regulator valve assembly such as illustrated in FIG. 1, generally indicated by the numeral 10. The regulator valve 10 includes a housing or housing assembly 11 within which there is disposed a valve 12 of the poppet type and a movable element 13 comprising a diaphragm to which and against which is disposed a cup-shaped backing plate 14. A first spring 15 in the form of a disc acts through the cup-shaped backing plate 14 to bias the diaphragm 13 in a direction to unseat the valve 12, and the amount of bias provided by the spring 15 is determined by the setting of a dial 16 which has a threaded connection 17 which acts between the housing 11 and the spring 15 for varying its bias.

The housing 11 includes a housing base 18 which is preferably molded of plastic, an inlet adapter portion 19 which is also molded of plastic, and a cover portion 20 which is also molded of plastic. The inlet adapter portion 19 is secured to the base portion 18 by four screws 21, and the cover portion 20 is secured to the base portion 18 by four screws 22 (FIG. 2). The inlet adapter portion 19 contains and supports a screen 23 within which there is disposed a second or further spring 24 that biases the valve 12 against valve moving means or valve engaging means which here comprises a hollow stem 25 which extends through the opening of a valve seat 26 on the housing base section 18. The inlet adapter portion 19 may be removed to service the valve 12, to clean the screen 23, and to enable replacement with another similar inlet adapter portion 19 having a selected configuration of a fitting 26a.

The housing 11 has an internal passage 27 which includes an inlet 28 in the inlet adapter portion 19, a cylindrical portion 29 also in the inlet adapter 19, the valve seat 26, a regulating chamber 30, and an outlet 31 formed as a fitting 32 on the housing base section 18. In the event that it is desired to have more than one outlet, an optional second outlet 33 may also be provided. One side of the diaphragm 13 communicates fluidly with the regulating chamber 30, and in this embodiment defines one wall of such regulating chamber 30. The other side of the diaphragm 13 is exposed to a reference chamber 34 which communicates with the ambient. The ambient may be atmosphere, and the ambient may constitute a liquid within which the regulator valve assembly 10 is submersed.

The cover portion 20 of the housing 11 clamps the periphery of the diaphragm 13, thus providing a seal at such periphery. The cover portion 20 has an opening 35 by which the reference chamber 34 communicates with the ambient, and through which a peripheral portion of the dial 16 projects. The cover portion 20 has a further aperture 36 which is centrally located for a purpose explained hereafter. The cover portion 20 of the housing 11 rotatably supports the dial 16, and to this end, the cover portion 20 has an internal recess 37 which receives a boss 38 on the dial 16. The dial 16 has a forwardly directed projection 39 which extends into a slot 40, the ends of which slot (not shown) constitute stops which limit the angular extent that the dial 16 may be rotated by abutting the projection 39.

The valve 12 has a generally square appearance when viewed in the direction of fluid flow, as best seen in FIG. 3. The corners of the valve 12 are rounded so that they are guided on the cylindrical portion 29 of the internal passage 27, and between such corners, there are thus provided four openings by which fluid can readily flow past the valve 12. The valve 12 includes a non-metallic insert 41, such as of rubber, which is cemented to or otherwise held in a recess in the metallic square portion of the valve 12. The rubber insert portion 41 engages and coacts with the valve seat 26 for regulating purposes, and with the end of the hollow stem 25 for pressure relief purposes.

The diaphragm 13 has a central aperture through which the hollow stem 25 projects, such aperture being aligned with a like aperture in the backing plate 14. The stem 25 has a head 42 which coacts through a washer 54 with the outer side of the backing plate 14, the stem being threaded and carrying a nut 43 which clamps the diaphragm 13, the backing plate 14, the washer 54, and the hollow stem 25 together. Thus the diaphragm 13 is provided with a relief passage 44 which extends therethrough and through the valve seat 26, the upstream end thereof being closed by the valve 12, and the downstream end being vented to the reference chamber 34.

The backing plate 14 is cup-shaped, and thereby includes a cylindrical portion which extends between the numerals 45 and 46 of FIG. 4, the outer end of the cylindrical portion 45, 46 being directed radially outward as at 47 to form a flat periphery against which the outer periphery of the spring disc 15 is engaged. The spring disc 15 has a pair of notches 48, 48 in its periphery into which there extends a pair of fingers 49, 49 which respectively constitute ears which are struck out of the flange 47. Thus the means 48, 49 constitute interfitting locating means which preclude relative rotation between the spring disc 15 and the backing plate 14.

The spring disc 15 has a central aperture in which a stem 50 is fixedly secured so as to preclude relative rotation. The stem 50 forms a part of the threaded connection 17, and for this purpose has external threads which mate with internal threads in the boss 38 of the dial 16. The friction at the threads 17 is relatively low so that when the dial 16 is rotated, the stem 50 is moved axially in and out, thereby changing the bias on the disc spring 15 to select the regulating pressure.

At its outer end, the stem 50 has a non-circular aperture 51, which, for example, is of hexagon cross-section, thereby enabling reception of an adjusting wrench or tool through the aperture 36 for rotating the stem 50 with the dial 16 manually held stationary for adjusting the calibration of the regulating pressure. To enable this adjustment, the nut 43 is secured with such tightness as to provide an overridable friction which enables the backing plate 14 to slip angularly with respect to the diaphragm 13. However, the friction at the center of the diaphragm 13 is not overcome during rotation of the dial 16, and such friction transmits the reactive force necessary to hold the stem 50 stationary during ordinary movements of the dial 16. The regulator valve 10 will thereby be calibrated so that a particular dial setting will represent a predetermined regulated or downstream pressure. For convenience, the dial 16 may be provided with indices or graduations which coact with an index marker 52 shown in FIG. 2. Because of this construction, not only is the dial 16 accessible through the opening 35, but the stem 50 is accessible through the opening 36.

The inlet 28 may be connected to a suitable source of high-pressure fluid, such as water, and the outlet 31 may be connected to a sub-system to be pressurized with a lower pressure determined by the selection of the angular position of the dial 16. Assuming that the sub-system to be pressurized constitutes a beverage carbonator, such carbonator may be immersed in a bath of refrigerating water, and the lines leading to and from the pressure regulating valve 10 may likewise, along with the regulator 10, be immersed in such water. With this type of usage in mind, all of the components preferably comprise water resistant material whereby any metal used is resistant to corrosion, and any plastic used is resistant to swelling or other deterioration.

With no pressure applied to either the inlet or the outlet, the spring disc 15 acts through the backing plate 14 to move the diaphragm 13 to the position illustrated, thereby acting also through the stem 25 to unseat the valve 12. This enables a pressurized fluid to enter the inlet 28, pass through the screen 23, flow past the sides of the squarish valve member 12, and through the annular opening in the seat 26, thence to the regulating chamber 30 and out through the outlet 31 to pressurize the sub-system connected thereto. As the pressure in the sub-system builds up, it acts on the relatively large area of the diaphragm 13 to move it in a direction against its bias, thereby retracting the hollow stem 25 to the point where the valve 12 engages the seat 26 to cut off admission of further pressurized fluid. During such closing movement, the spring 24 holds the seat 12 in closing engagement with the upstream end of the stem 25, so that the relief passage 44 is held closed. In the event that the pressure in the sub-system should thereafter increase, the pressure in the regulating chamber 30 would likewise increase and would displace the diaphragm 13 by an additional amount, thereby unseating the hollow stem 25 from the valve 12 which is then held by the spring 24 against the seat 26. Such unseating does not affect the pressure that is present on the upstream side of the valve 12, and upon suitable venting or relieving, the spring disc 15 will reclose the relief passage 44 at the selected regulating pressure. Thus the rotation of the dial 16 automatically adjusts not only the setting of the regulated downstream pressure, but also correspondingly adjusts the setting of the components that provide the relieving function.

As the dial 16 has graduations which preferably directly indicate the selected downstream pressure, the need for an external gage in many instances has been eliminated. As also explained, the need for a separate relief valve has been eliminated. Moreover, where there is no objection to commingling of any relieved pressurized fluid with the fluid ambient, even though such ambient may comprise liquid and the pressurized fluid may comprise liquid, the device may be submersed, thereby eliminating the need for any separate relief fitting or line even though the relieved fluid is a liquid. Even though the regulator valve assembly 10 be submersed, the dial 16 is readily rotated because of peripheral knurling 53. Therefore, the dial 16 is not only an adjusting dial but is an indicator dial.

The periphery of the screen 23 makes a seal with the portion 29 of the inlet adapter 19 downstream of the inlet passageway 28 but upstream of the valve seating surfaces.

It is also to be understood that the present regulator can be used to control the amount of carbon dioxide gas pressure applied to the carbonator in the system described, and any venting of carbon dioxide gas to the ambient coolant water is harmless.

I claim as my invention:
1. A pressure regulator valve, comprising:
    (a) a housing having an inlet connected by an internal passage to an outlet, said passage extending through a valve seat on said housing, said passage including a regulating chamber disposed downstream from said seat;

(b) a valve disposed in said passage and engageable with said seat to block said passage;

(c) a diaphragm carried by said housing and arranged to move said valve into and out of engagement with said seat, one side of said diaphragm communicating fluidly with said regulating chamber, and the other side of said diaphragm communicating fluidly with the ambient;

(d) a cup-shaped backing plate secured to said diaphragm; and (e) a spring disc supported at its outer periphery by the outer periphery of said cup-shaped plate, and acting therethrough between said housing and said diaphrgam in a direction tending to disengage said valve from said seat, said disc and said plate having interfitting locating means at their outer peripheries.

2. A pressure regulator valve as set forth in claim 1, which includes a pair of members having an angularly adjustable threaded connection therebetween, one member acting against said housing and the other member acting against said spring disc for selecting the force applied by said spring disc.

3. A pressure regulator valve as set forth in claim 2, in which said pair of members are disposed within said housing and are accessible for adjustament through an opening in said housing.

4. A pressure regulator valve as set forth in claim 1, in which said housing includes a removable adapter portion having said inlet, a screen and said valve being removably disposed within, and said valve being slidably guided by, said adapter portion.

5. A pressure regulator valve comprising:

(a) a housing having an inlet connected by an internal passage to an outlet, said passage extending through a valve seat on said housing, said passage including a regulating chamber disposed downstream from said seat;

(b) a valve disposed in said passage and engageable with said seat to block said passage;

(c) a movable element carried by said housing and having means arranged to move said valve into and out of engagement with said seat, one side of said element communicating fluidly with said regulating chamber, and the other side of said element communicating fluidly with the ambient;

(d) a spring biasing said movable element in a direction tending to disengage said valve from said seat;

(e) a finger dial disposed in said housing with a periphery of said dial projecting through an opening in said housing, said dial and housing having coacting portions for rotatably supporting said dial in an axially fixed position; and (f) a threaded connection between a threaded portion on said dial and a threaded portion on said spring enabling the angular position of said dial to determine the magnitude of the bias of said spring, said spring acting through said threaded connection to hold said coacting portions axially together.

6. A pressure regulator valve as set forth in claim 5 in which said dial and said housing each have axially fixed means for limiting the extent of dial rotation.

7. A pressure regulator valve as set forth in claim 5, in which said spring and said movable element have interfitting means by which said movable element holds said spring against rotation.

8. A pressure regulator valve comprising:

(a) a housing having an inlet connected by an internal passage to an outlet, said passage extending through a valve seat on said housing, said passage including a regulating chamber disposed downstream from said seat;

(b) a valve disposed in said passage and engageable with said seat to block said passage;

(c) a movable element carried by said housing and having means arranged to move said valve into and out of engagement with said seat, one side of said element communicating fluidly with said regulating chamber, and the other side of said element communicating fluidly with the ambient;

(d) a spring biasing said movable element in a direction tending to disengage said valve from said seat, said spring being held against rotation by said movable element;

(e) a finger dial rotatably supported by said housing in an axially fixed position; and (f) a stem secured to said spring, said stem having threads engaging with coaxial mating threads on said rotatable dial and forming a connection therebetween enabling the angular position of said dial to determine the magnitude of the bias of said spring.

9. A pressure regulator valve as set forth in claim 8, in which said housing is apertured to provide access to said threaded stem, said threaded stem being rotatable with respect to said spring for calibrating the setting of said dial.

10. A pressure regulator valve comprising:

(a) a housing having an inlet connected by an internal passage to an outlet, said passage extending through a valve seat on said housing, said passage including a regulating chamber disposed downstream from said seat;

(b) a valve disposed in said passage and engageable with said seat to block said passage;

(c) a movable element carried by said housing and held against rotation and having means arranged to move said valve into and out of engagement with said seat, one side of said element communicating fluidly with said regulating chamber, and the other side of said element communicating fluidly with the ambient;

(d) a cup-shaped plate normally non-rotatably secured to said movable element;

(e) a spring comprising a disc supported at its periphery by the periphery of said cup-shaped plate and acting therethrough on said movable element to bias said movable element in a direction tending to disengage said valve from said seat;

(f) means on said plate and said disc precluding rotation therebetween;

(g) a finger dial rotatably supported by said housing in an axially fixed position; and (h) a threaded connection between a threaded portion on said dial and a threaded portion on said spring enabling the angular position of said dial to determine the magnitude of the bias of said spring.

11. A pressure regulator valve comprising:

(a) a housing having an inlet connected by an internal passage to an outlet, said passage extending through a valve seat on said housing, said passage including a regulating chamber disposed downstream from said seat;

(b) a valve disposed in said passage and engageable with said seat to block said passage;

(c) a movable element carried by said housing and having means arranged to move said valve into and out of engagement with said seat, one side of said element communicating fluidly with said regulating chamber, and the other side of said element communicating fluidly with the ambient;

(d) a spring in the form of a disc, the outer periphery of said spring disc transmitting a biasing force to said movable element in a direction tending to disengage said valve from said seat, said spring having a threaded portion secured to the center of said spring disc;

(e) a finger dial rotatably supported by said housing in an axially fixed position; and (f) a threaded connection between a threaded portion on said dial and said threaded portion on said spring enabling the angular position of said dial to determine the magnitude of the bias of said spring enabling the angular position of said dial to determine the magnitude of the bias of said spring.

References Cited

UNITED STATES PATENTS

| | | | |
|---|---|---|---|
| 1,196,142 | 8/1916 | Schroeder | 137—224 |
| 1,701,284 | 2/1929 | Terry | 137—116.5 |
| 1,742,323 | 1/1930 | Slagel | 137—505.42 XR |
| 1,903,338 | 4/1933 | Horne | 137—116.5 |
| 2,655,935 | 10/1953 | Kinzbach. | |
| 2,768,643 | 10/1956 | Acomb | 137—505.42 |
| 2,876,745 | 3/1959 | Conway et al. | |
| 3,139,898 | 7/1964 | Wiltgen et al. | 137—505.46 XR |
| 3,288,165 | 11/1966 | Cranage | 137—510 |
| 3,357,687 | 12/1967 | Vanderpoel | 137—505.42 XR |
| 3,375,000 | 3/1968 | Seamonds et al. | |

FOREIGN PATENTS 1,277,585   10/1961   France.

ROBERT G. NILSON, Primary Examiner

U.S. Cl. X.R.

92—95; 137—505.42; 267—1